(No Model.)
C. S. CANNON.
TETHER.
No. 340,554. Patented Apr. 27, 1886.
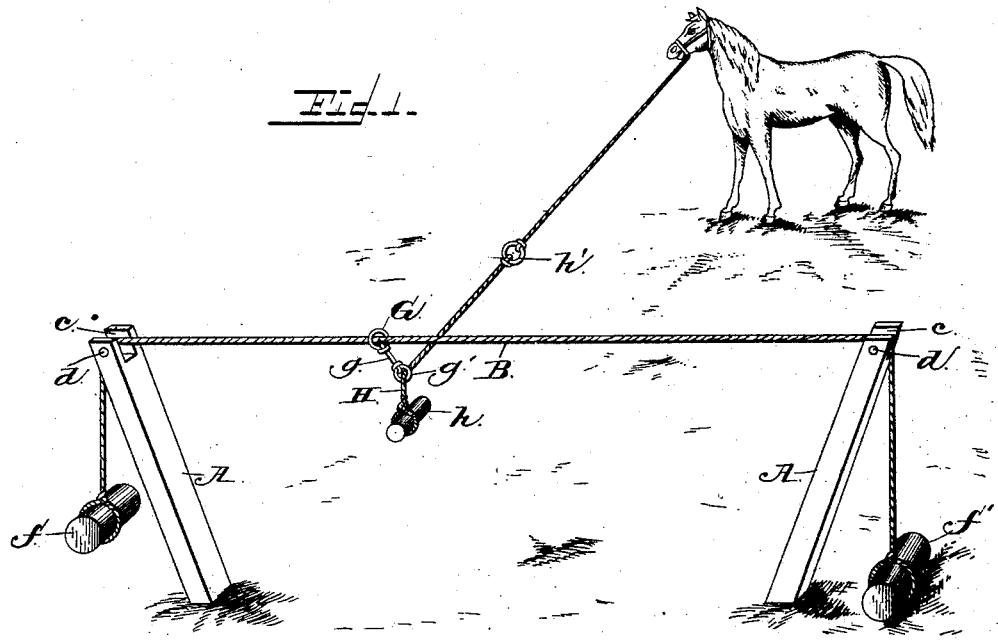
Witnesses
M. E. Fowler
H. C. Bernhard
Inventor
C. S. Cannon
By his Attorneys
C. A. Snow & Co.

UNITED STATES PATENT OFFICE.

CORODON S. CANNON, OF GALESBURG, MICHIGAN.

TETHER.

SPECIFICATION forming part of Letters Patent No. 340,554, dated April 27, 1886.

Application filed January 28, 1886. Serial No. 190,113. (No model.)

*To all whom it may concern:*

Be it known that I, CORODON S. CANNON, a citizen of the United States, residing at Galesburg, in the county of Kalamazoo and State of Michigan, have invented a new and useful Improvement in Tethers, of which the following is a specification, reference being had to the accompanying drawing.

My invention relates to tethers; and it consists of the peculiar construction and combination of parts, substantially as hereinafter fully set forth, and specifically pointed out in the claims.

The primary object of my invention is to provide means whereby domestic animals can be confined within certain limits, while at the same time they are allowed to move and feed freely within the space allotted them.

A further object of the invention is to provide means which shall be very simple and strong in construction, thoroughly effective for the purposes designed, and cheap and inexpensive of manufacture.

The accompanying drawing is a perspective view of my invention, showing an animal attached to the device.

Referring to the drawing, in which like letters of reference denote corresponding parts in the figure, A designates supporting uprights or posts that are planted in the ground at a suitable distance apart at the place where the animal is to be tethered or confined to allow it to feed and exercise. The posts may be of any height, so as to permit the animal to pass freely beneath a chain, cable, rope, or other suitable connection, B, that extends from one post to another to form a track, and is supported and held therein. The posts are bifurcated or slotted at their upper ends, as at $c$, and in the side pieces thereof are supported pins $d$. These pins may be provided with grooved guide-pulleys that are loosely journaled thereon to reduce the friction between the cable, rope, or other flexible support, B, that passes over the pins, and the extremities of this cable, &c., have two weights, $f f'$, secured thereon in any suitable manner, the weight $f'$ being of greater ponderosity than the weight $f$, whereby when the cable is drawn laterally by the efforts of an animal attached thereto the weight $f$ will be drawn upwardly until it reaches the upper end of the post, where it is held or prevented from further upward movement by reason of the weight being larger than the slot $c$, and should the animal continue to pull on the cable the other weight, $f'$, thereof will also be drawn upwardly until it is stopped from movement by coming in contact with the slotted or bifurcated portion of the post. It will be seen that the animal is thus allowed considerable freedom and a large area or space within which to feed and exercise, and when the strain or pull on the cable is released the weights automatically descend by gravity and serve to hold the cable taut and under proper tension at all times. It is desirable that the cable shall thus be held under tension, for the reason that the tethering device shall move freely thereon to permit the animal to graze at either end or on either side of the cable that confines him within the allotted area.

G designates a movable sliding ring that is loosely fitted on the cable or rope, and to this ring is secured a short cord or chain, $g$, which has a similar supporting ring or loop, $g'$. A rope, chain, or other flexible connection, H, passes through this ring or loop $g'$, one end of this chain being connected to the halter, collar, or other part of the harness of the animal to be confined within the space, while the other end has a weight, $h$, suitably secured thereon. This rope or chain H has a ring, an enlarged collar, or a rod, $h'$, secured thereto near its weighted end and adapted to serve as a stop to limit the downward movement of the weight and keep the same out of contact with the ground, so that the animal can move the ring G along the wire, and also move the weight, thus allowing him to graze at either end of the cable. It will be observed that the animal can pass beneath the cable without hinderance therefrom, to graze or exercise on either side of the same, that it can also graze at the ends of the cable, and that the cable will yield or give when strain is exerted thereon, to permit the animal to graze at a greater distance to one side of the same, while at the same time it is confined within a certain allotted area and prevented from roaming over and damaging corn or other fields and gardens.

Various slight changes in the form and proportion of parts and details of construction may be made without departing from the principle of my invention.

Having thus described my invention, what I claim as new, and desire to secure by Letters Patent, is—

1. In a tether, the combination of the posts, a track connecting the posts, a movable ring, G, traversing on the track, a swiveled ring suspended from the movable ring, and a weighted rope to be connected to the animal and having a stop intermediate its ends adapted to come in contact with the swiveled ring and suspend the weight out of contact with the ground, substantially as described.

2. In a tether, the combination of the posts A, a cable, B, passing over the posts and having the weights $ff'$ connected to the free ends thereof and of unequal heaviness, a movable ring, G, traversing on the cable, a ring, $g'$, suspended from the movable ring by an intermediate swivel-connection, $g$, and a rope, H, adapted to be secured to an animal and having a weight, $h$, at one end, and a stop-ring, $h'$, to suspend the weight out of contact with the ground, substantially as described.

In testimony that I claim the foregoing as my own I have hereto affixed my signature in presence of two witnesses.

CORODON S. CANNON.

Witnesses:
 A. F. MACK,
 C. A. TOWNE.